United States Patent [19]
Yamaguchi

[11] Patent Number: 5,639,486
[45] Date of Patent: Jun. 17, 1997

[54] CONTROL DEVICE FOR AN EJECTOR MECHANISM USED IN AN INJECTION MOLDING MACHINE

[75] Inventor: Hiroshi Yamaguchi, Chiba, Japan

[73] Assignee: Sumitomo Heavy Industries, Ltd., Tokyo, Japan

[21] Appl. No.: 441,311

[22] Filed: May 15, 1995

[30] Foreign Application Priority Data

May 16, 1994 [JP] Japan ................... 6-100404

[51] Int. Cl.$^6$ .................... B29C 45/80
[52] U.S. Cl. .................... 425/139; 425/556; 264/40.1; 264/40.5
[58] Field of Search .................... 425/139, 556; 264/40.1, 40.5

[56] References Cited

U.S. PATENT DOCUMENTS

| | | | |
|---|---|---|---|
| 4,726,920 | 2/1988 | Yokota | 204/40.5 |
| 4,889,667 | 12/1989 | Kojima et al. | 204/40.1 |
| 4,892,690 | 1/1990 | Buja | 264/40.1 |
| 4,961,696 | 10/1990 | Yamamura | 425/149 |
| 5,028,365 | 7/1991 | Neko et al. | 264/40.1 |
| 5,059,364 | 10/1991 | Okubo et al. | 264/40.1 |
| 5,223,191 | 6/1993 | Tatsumo et al. | 264/40.1 |
| 5,470,513 | 11/1995 | Nogawa et al. | 264/40.1 |
| 5,482,662 | 1/1996 | Nakamura et al. | 264/40.1 |

*Primary Examiner*—Long V. Le
*Attorney, Agent, or Firm*—Burns, Doane, Swecker & Mathis, LLP

[57] ABSTRACT

An ejector mechanism calibration method is for use in an injection molding machine including an ejector mechanism for ejecting a molded product out of a mold. The ejector mechanism is operable to carry out, when the molded product is ejected, an advance operation in which the ejector member is moved forward to a first position and to carry out, after the molded product is ejected, a reverse operation in which the ejector member is moved backward. The ejector member is adapted to be stopped by a stopper located at a second position spaced from the first position in a backward direction. A controller carries out a calibrating operation at a start of an injection molding process. The calibrating operation comprises steps of starting the reverse operation, judging whether or not the ejector member is stopped by the stopper after the reverse operation is started, bringing the reverse operation to an end when it is judged that the ejector member is stopped, advancing the ejector member for a predetermined distance L from the second position to a stop position which is determined as a reverse completion position.

3 Claims, 6 Drawing Sheets

CONTROL DEVICE FOR AN EJECTOR MECHANISM USED IN AN INJECTION MOLDING MACHINE

BACKGROUND OF THE INVENTION

This invention relates to an injection molding machine comprising a mold for molding a resin material into a molded product and an ejector mechanism for ejecting the molded product out of the mold and, in particular, to a calibration method and a control device for an ejector mechanism.

An ejector mechanism of the type described comprises an ejector member driven by a servo motor. In order to eject a molded product, an advance operation is carried out in which the ejector member is advanced or moved forward. After ejection of the molded product, a reverse operation is carried out in which the ejector member is returned or moved backward. Generally, the servo motor is coupled to an encoder. The encoder produces a pulse signal having a variable number of pulses which varies in correspondence to the number of rotation of the servo motor. The number of pulses contained in the pulse signal is counted by an updown counter as a count value. The count value is related to a travelling distance of the ejector member and is therefore used to monitor a stop position where the ejector member is stopped after the molded product is ejected and the ejector member is reversed. Such monitoring of the stop position is required because, in order to carry out an accurate ejection, it is important to precisely adjust the stop position where the ejector member is stopped after the reverse operation. Thus, the encoder serves as a position detector for the ejector member.

In the ejector mechanism described above, it is necessary to carry out calibration by the use of a detector such as a proximity switch when a control power supply is turned on, namely, when an injection molding process is started. For this purpose, the detector is located in an intermediate position of a travelling path of the ejector member. Briefly speaking, in a conventional calibration method, the reverse operation of the ejector member is carried out at the start of the injection molding process. In the reverse operation, the ejector member is moved backward to a position where the detector is turned on to produce an ON signal. In response to the ON signal, the updown counter clears the count value into a reset value of zero. Thus, the ejector mechanism is calibrated.

In the above-mentioned conventional calibration method, however, a location of the detector must be modified every time when the mold is exchanged for another mold.

SUMMARY OF THE INVENTION

It is therefore an object of this invention to provide a calibration method and a control device for an ejector mechanism, which are capable of carrying out calibration with an improved operability and an improved accuracy.

A calibration method according to this invention is applicable to an injection molding machine comprising a mold for molding a resin material into a molded product and an ejector mechanism for ejecting the molded product out of the mold. The ejector mechanism comprises an ejector member, a servo motor for driving the ejector member, and a controller for controlling the servo motor. The ejector mechanism is operable to carry out, when the molded product is ejected, an advance operation in which the ejector member is moved forward to a first position and to carry out, after the molded product is ejected, a reverse operation in which the ejector member is moved backward. According to this invention, the ejector member is adapted to be stopped by a stopper located at a second position spaced from the first position in a backward direction. The controller is for carrying out, at the start of an injection molding process, a calibrating operation to determine a third position between the first and the second positions as a reverse completion position of the ejector member. The calibrating operation comprises a first step of starting the reverse operation at the start of the injection molding process, a second step of detecting whether or not the rotation of the servo motor is stopped after the start of the reverse operation to thereby judge whether or not the ejector member is stopped by the stopper, a third step of interrupting the reverse operation when it is judged that the ejector member is stopped, a fourth step of memorizing, in relation to a travelling distance of the ejector member, a stop position where the ejector member is stopped, and a fifth step of advancing the ejector member for a predetermined distance L from the second position to another stop position determined as a third position. In a subsequent injection molding process, the third position determined in the fifth step serves as a normal stop position of the ejector member after ejection of every molded product.

DESCRIPTION OF THE PREFERRED EMBODIMENTS

Figure 1:
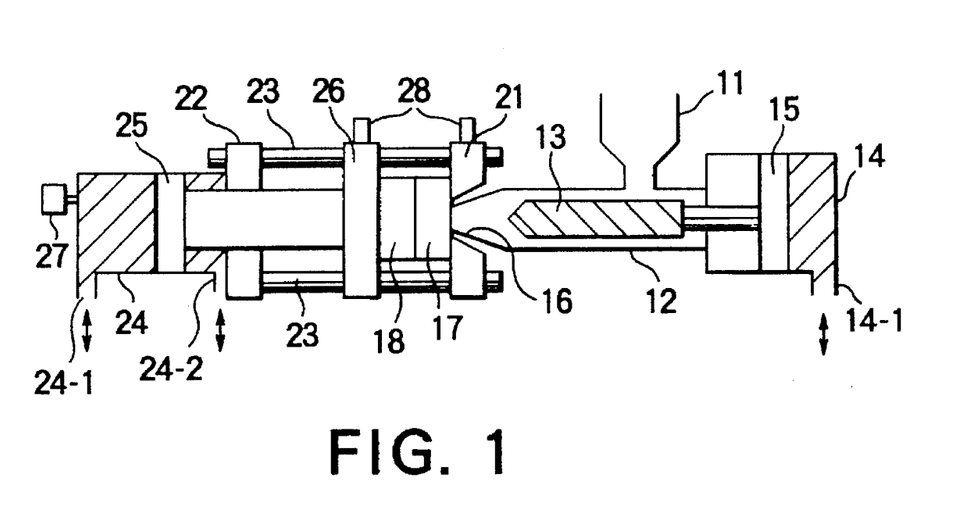
FIG. 1 is a schematic diagram for describing a structure of an injection molding machine to which this invention is applicable.

Referring to FIG. 1, description will at first be made as regards an injection unit and a clamping unit of an injection molding machine to which this invention is applicable. In the injection unit, a resin material is put into a hopper 11 and is supplied to a heating cylinder 12. The resin material is melted in the heating cylinder 12 while being kneaded and measured by a screw 13. The melted resin material is reserved in a forward area before the screw 13. The screw 13 is rotated by a rotation driving mechanism which is not shown in the figure. The screw 13 is also driven by a first hydraulic cylinder mechanism comprising an injection cylinder 14 and a piston 15 and is moved forward, namely, towards a mold. When the first hydraulic cylinder mechanism makes the screw 13 move towards the mold, the melted resin material reserved in the forward area before the screw 13 is delivered through a nozzle 16 to be filled within a cavity of the mold comprising a fixed mold 17 and a movable mold 18. In a filling process and a holding process, driving oil having a controlled flow speed or a controlled pressure flows into and flows out from the injection cylinder 14 through an inlet/outlet port 14-1.

On the other hand, the clamping unit is fixed to a frame which is not illustrated in the figure. Opposite to a fixed platen 21 to which the fixed mold 17 is attached, a rear platen 22 is fixedly supported through four tie bars 23 (only two of them are illustrated in the figure). Behind the rear platen 22, a second hydraulic cylinder mechanism including a hydraulic cylinder 24 and a piston 25 is formed. The piston 25 is arranged in the hydraulic cylinder 24 fixed behind the rear platen 22. The piston 25 is coupled to a movable platen 26 to which the movable mold 18 is attached. The movable platen 26 is slidable along the tie bars 23 with the movement of the piston 25. Specifically, when the driving oil is fed from an inlet/outlet port 24-1 to the hydraulic cylinder 24 through a pressure control valve which is not shown in the figure, the movable platen 26 is moved in a direction such that the mold is closed. At this time, the driving oil flows out from an inlet/outlet port 24-2. On the other hand, when the driving oil is fed from the inlet/outlet port 24-2 to the hydraulic cylinder 24, the movable platen 26 is moved in an opposite direction such that the mold is opened. At this time, the driving oil flows out from the inlet/outlet port 24-1.

The hydraulic cylinder 24 is provided with a first pressure sensor 27 for detecting a hydraulic pressure. While the mold is closed, the first pressure sensor 27 detects, as a detected clamping pressure, a hydraulic pressure within the hydraulic cylinder 24 at the side of the inlet/outlet port 24-1 and produces a pressure detection signal representative of the detected clamping pressure. The clamping pressure is controlled by adjusting the pressure control valve in response to the pressure detection signal supplied from the first pressure sensor 27. One of the fixed platen 21 and the movable platen 26 is provided with an ejector mechanism which will later be described. The ejector mechanism is for ejecting a molded product out of the mold every time when a molding cycle is completed.

Figure 2:
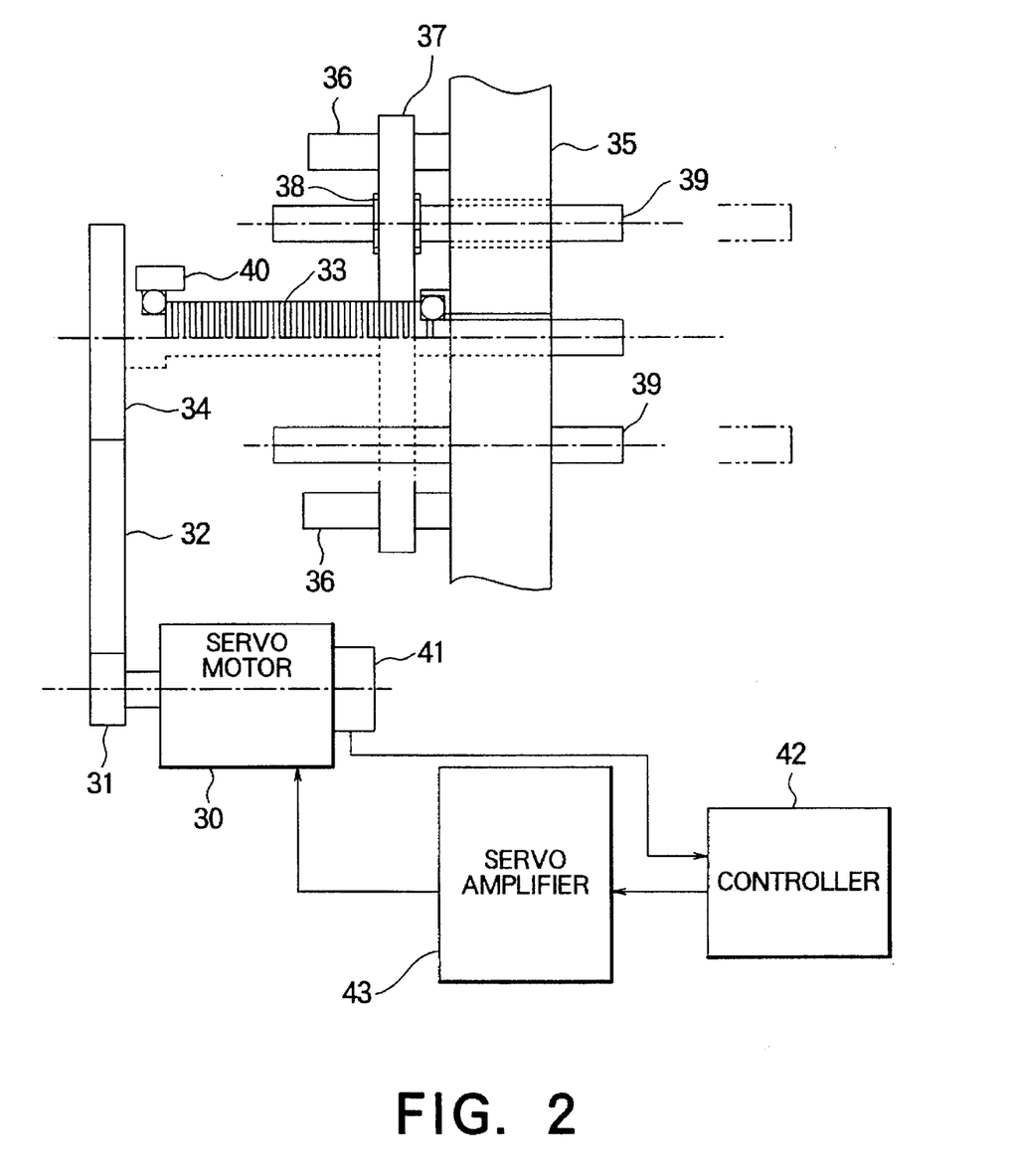
FIG. 2 is a schematic diagram of an ejector mechanism to which this invention is applicable, and a control device thereof.

Referring to FIG. 2, description will be made as regards the ejector mechanism and a control section thereof according to this invention. A servo motor 30 serves as a driving source of the ejector mechanism and is rotatable in a normal mode and a reverse mode. The servo motor 30 has an output shaft coupled to a gear 31. The rotation of the gear 31 is transmitted through a belt 32 to another gear 32 attached to a ball screw 33. On the other hand, a movable platen 35 corresponding to the movable platen 26 illustrated in FIG. 1 is provided with a plurality of guide bars 36 fixed thereto. A guide plate 37 is attached to the guide bars 36 to be movable in advancing and reverse directions of an ejector member which will later be described. The guide plate 37 is fixedly coupled by eject nuts 38 to a plurality of eject rods 39 and is engaged with one end of a threaded portion of the ball screw 33. With this structure, the guide plate 37 and the eject rods 39 are can be moved forward or backward along the guide bars 36 in response to normal or reverse revolution of the ball screw 33. In other words, when the molded product is ejected, an advance operation is carried out to advance the eject rods 39 to a stop position indicated by double dot-and-dash lines in FIG. 2 together with the guide plate 37. The stop position is referred to as a first position. The advancing distance is preliminarily given by a setting unit which is not illustrated in the figure. Upon completion of ejection, a reverse operation is carried out to return the guide plate 37 and the eject rods 39 in a reverse direction. A combination of the guide plate 37 and the eject rods 39 will collectively be called an ejector mender in the following description. In the vicinity of the other end of the threaded portion of the ball screw 33, a stopper 40 is formed. The stopper 40 is for engaging the guide plate 37 upon the reverse operation of the ejector member to define a mechanical end or a reverse limit position of the ejector member.

The servo motor 30 is coupled to a position detector 41, including a PG encoder and a counter (updown counter), for detecting a position of the ejector member. The position detector 41 detects the number of rotation of the servo motor 30 and calculates, as a detected position, the position of the ejector member in response to the number of rotation as detected. The position detector 41 delivers to a controller 42 a position detection signal indicative of the detected position. The position of the ejector member is related to a travelling distance of the ejector member. The travelling distance of the ejector member is related to the number of rotation of the servo motor 30. Specifically, the PG encoder produces a pulse signal having a variable number of pulses which varies in response to the number of rotation of the servo motor 30. The counter counts the number of pulses contained in the pulse signal to produce a count value. The count value indicates the travelling distance of the ejector member. The travelling distance teaches a current position of the ejector mender. An output of the controller 42 is amplified by a servo amplifier 43 and supplied to the servo motor 30.

Figure 3:
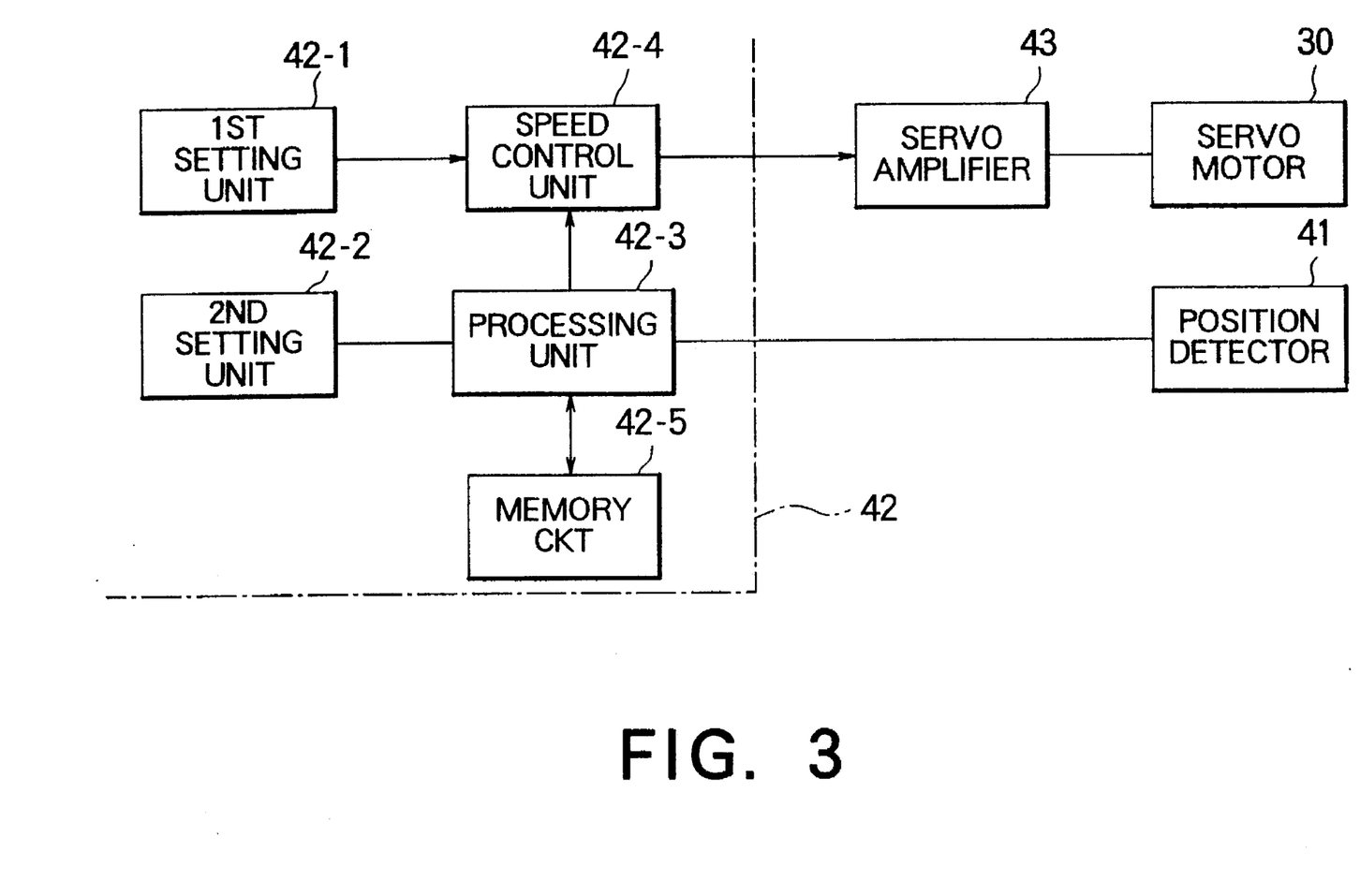
FIG. 3 is a block diagram for describing a structure of a controller illustrated in FIG. 2 together with some other components of the ejector mechanism connected thereto.

Referring to FIG. 3, description will proceed to the controller 42. The controller 42 has a first setting unit 42-1 for supplying a selected speed value to the servo motor 30, a second setting unit 42-2 for supplying, as a selected position value, a calibration completion position which will later be described, a processing unit 42-3, a speed control unit 42-4 for controlling the rotation speed of the servo motor 30 in response to the selected speed value given by the first setting unit 42-1 and an output of the processing unit 42-3, and a memory circuit 42-5 for memorizing a detected value detected by the position detector 41. Supplied with the selected position value given by the second setting unit 42-2, the detected value read from the memory circuit 42-5, and a currently detected position detected by the position detector 41, the processing unit 42-3 carries out judgement and processing which will later be described.

In the injection molding machine, the reverse operation is carried out to return the ejector member towards the stopper 40 when a control power supply is turned on, namely, at the start of an injection molding process. In the reverse operation, the servo motor 30 is reversely rotated to thereby rotate the ball screw 33 in a reverse direction until the guide plate 37, namely, the ejector member is engaged by the stopper 40. The processing unit 42-3 in the controller 42 monitors the detected value supplied from the position detector 41 and judges whether or not the rotation of the servo motor 30 is stopped. This is because, when the ejector member is engaged with the stopper 40 to be stopped at a stop position, the rotation of the servo motor 30 is stopped. Detecting that the ejector member is stopped, the processing unit 42-3 stops the reverse operation.

Herein, if the stop position defined by the stopper 40 is selected as the calibration completion position, the reverse operation must be maintained in such a condition that the servo motor 30 continues to apply a torque to the ejector member in the reverse direction. For this purpose, the servo motor 30 must produce an excessive torque. In this event, an abnormal condition may be caused due to overheat of the servo motor 30 and an overcurrent flowing through the servo motor 30.

In order to avoid the above-mentioned disadvantage, according to this invention, the reverse operation is stopped immediately after the rotation of the servo motor 30 is stopped by the stopper 40 in the reverse operation. Subsequently, the servo motor 30 is rotated in the normal mode to advance the ejector member for a predetermined distance L. After advancing for the predetermined distance L, the ejector member is stopped at a stop position which is selected as the calibration completion position. Thus, it is unnecessary to maintain the reverse operation in the condition that the servo motor 30 continues to apply a torque to the ejector member in the reverse direction as described above. The predetermined distance L is preliminarily decided by a test. The predetermined distance L is supplied from the second setting unit 42-2 to the processing unit 42-3.

Figure 4:
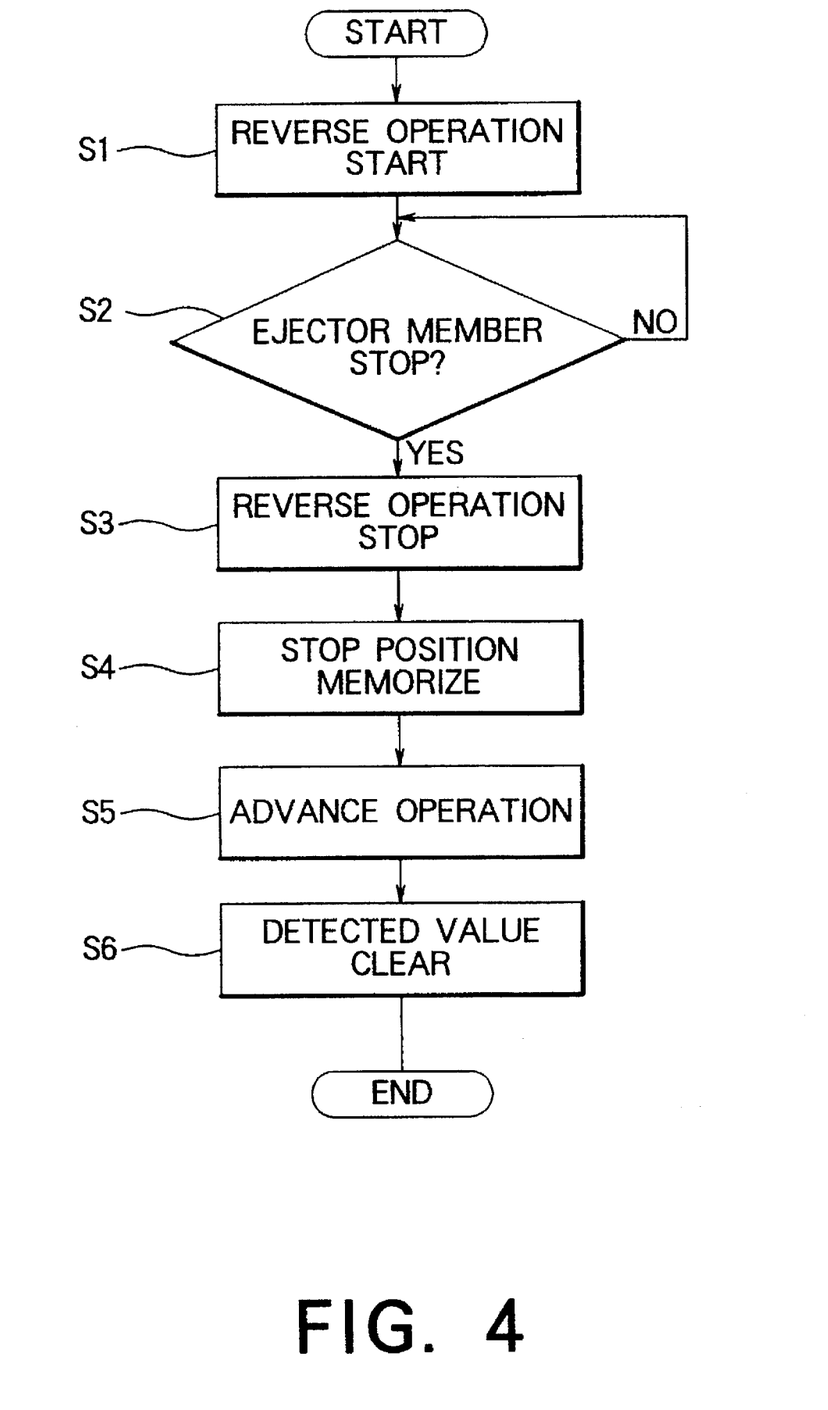
FIG. 4 is a flow chart for describing an operation according to a first embodiment of this invention.

Referring to FIG. 4 in addition to FIGS. 2 and 3, description will now proceed to a calibrating operation according to a first embodiment of this invention. In a step S1, the servo motor 30 is reversely rotated, after the control power supply is turned on, in either an automatic operation mode or a manual operation mode to start an initial or first reverse operation of the ejector member. In a step S2, the processing unit 42-3 judges whether or not the ejector member is stopped. When judgement is made that the ejector member is stopped by the stopper 40, the step S2 is followed by a step S3 in which the reverse operation of the ejector member is stopped. In a step S4, the processing unit 42-3 makes the memory circuit 42-5 memorize, as a reverse limit position, the detected value detected by the position detector 41 at that time. The reverse limit position may be called a second position and is related to the travelling distance of the ejector member as described in the foregoing.

In order to detect that the ejector member is stopped in the first reverse operation, the processing unit 42-3 monitors the detected value given by the position detector 41 to detect that the rotation of the servo motor 30 is stopped, as described above.

In a step S5, the servo motor 30 is normally rotated to thereby advance the ejector member for the predetermined distance L. After advancing for the predetermined distance L, the ejector member is stopped at the stop position. The stop position is the calibration completion position and may be called a third position. Subsequently, in a step S6, the detected value detected by the position detector 41 at the calibration completion position, namely, the count value of the updown counter is cleared into a reset value of zero.

As described above, according to this embodiment, the servo motor 30 is reversely rotated in the first reverse operation of the ejector member until the ejector member and the stopper 40 are engaged with each other. Thereafter, when the processing unit 42-3 detects that the ejector member and the stopper 40 are engaged and the rotation of the servo motor 30 is stopped, the processing unit 42-3 makes the servo motor 30 normally rotate so that the ejector member is advanced for the predetermined distance L. This removes mechanical inertia from the output shaft of the servo motor 30 to the eject rods 39 to minimize the torque produced by the servo motor 30. In addition, even if the calibration completion position must be modified with an exchange of the mold, the calibration completion position can readily be determined by advancing the ejector member for the predetermined distance L after detecting that the ejector member is stopped at the reverse limit position.

In the above-mentioned first embodiment, the calibrating operation is carried out at the start of the control power supply, namely, at the start of the injection molding process. If the PG encoder is used as the position detector 41, the position detector 41 may suffer various errors such as a counting error by the updown counter, an error in the PG encoder itself, and a counting error resulting from a noise. If a continuous molding process is carried out by the use of the ejector mechanism with such a malfunctional position detector, the detected position detected by the position detector 41 may be incoincident with an absolute position of the ejector member.

In order to solve the above-mentioned problem, proposal is made to carry out the calibrating operation not only at the start of the control power supply but also every time when the reverse operation is carried out after completion of ejection.

Figure 5:
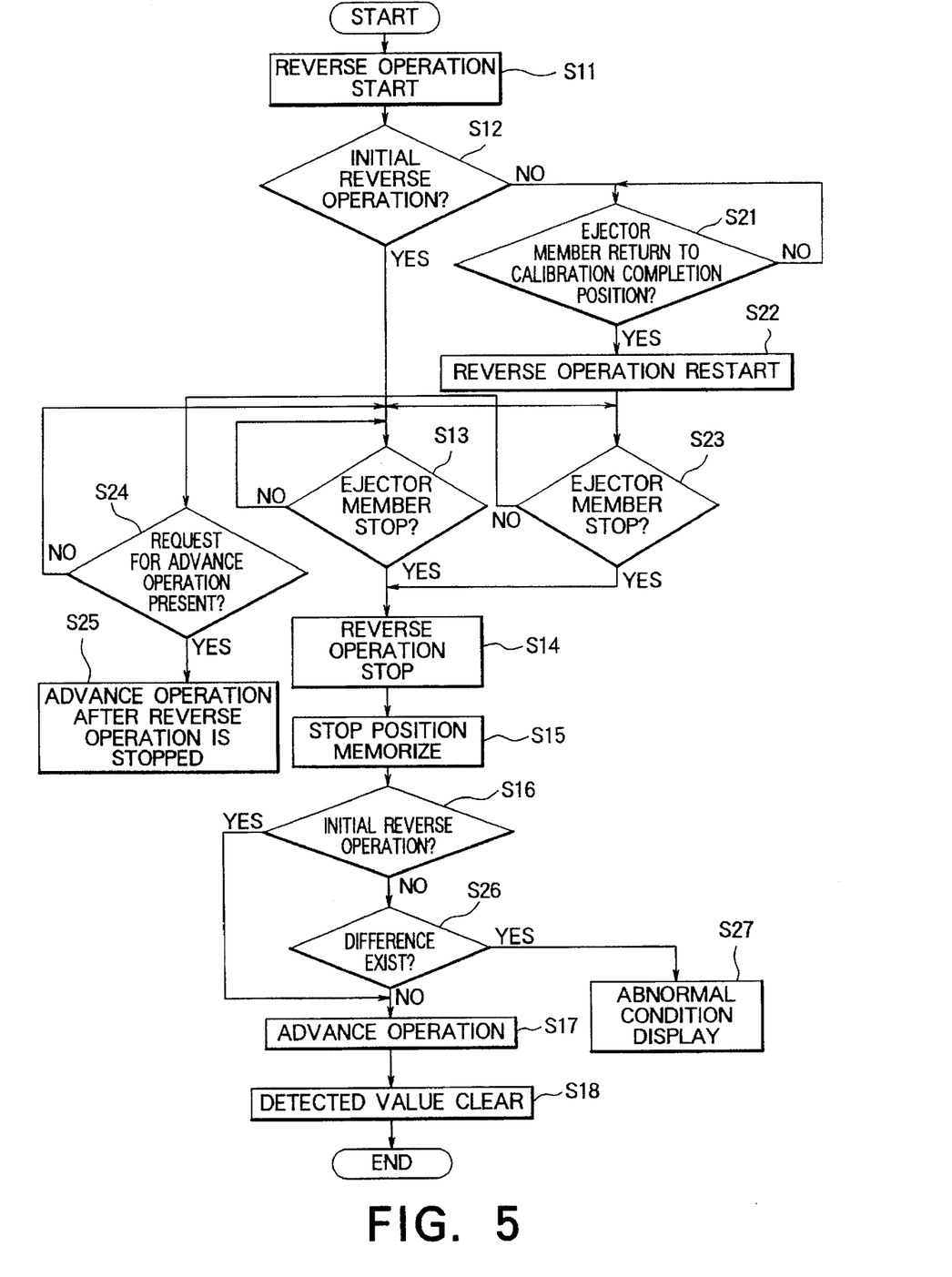
FIG. 5 is a flow chart for describing an operation according to a second embodiment of this invention.

In order to recover such incoincidence between the detected value detected by the position detector 41 and the absolute position of the ejector member, the controller 42 is made to have an abnormal condition detecting function according to a second embodiment of this invention. Referring to FIGS. 2, 3, and 5, the second embodiment will be described.

In a step S11, the reverse operation of the ejector member is started in either the automatic operation mode or the manual operation/setup mode. In a step S12, judgement is made whether or not the reverse operation is an initial one at the start of the control power supply. In case of the initial reverse operation, the step S12 is followed by a step S13 to detect whether or not the ejector member is stopped. When it is detected in the step S13 that the ejector member is stopped, the reverse operation is stopped in a step S14, in the manner similar to the first embodiment described above. Subsequently, in a step S15, the memory circuit 42-5 memorizes as a reference position the detected value detected by the updown counter, namely, the reverse limit position of the ejector member.

In a step S16, judgement is made whether or not the reverse operation is the initial one, in the manner similar to the step S12. Herein, the reverse operation is the initial one and the step S16 is followed by a step S17. In the step S17, the ejector member is advanced for the predetermined distance L and is stopped at a stop position selected as a calibration completion position. In a step S18, the count value of the updown counter in the position detector 41 is cleared into a reset value of zero. Thus, the initial calibrating operation is completed.

On the other hand, when judgement is made in the step S12 that the reverse operation of the ejector member is not the initial one, the step S12 proceeds to a step S21. In the step S21, judgement is made whether or not the ejector member is returned to the calibration completion position. This judgement is achieved by monitoring whether or not the updown counter indicates the count value equal to zero. When it is judged that the ejector member returns to the calibration completion position, the reverse operation is restarted in a step S22 to return the ejector member to the stopper 40. In a step S23 following the step S22, detection is made whether or not the ejector member reaches the stopper 40 to be stopped. When the ejector member is stopped, the step S23 proceeds to the step S14 to carry out the operation mentioned above.

Until it is detected in the step S23 that the ejector member is stopped, a judging operation in a step S24 is carried out. The step S24 assumes a case where the advance operation of the ejector member is manually requested during the reverse operation of the ejector member. If a request for the advance operation of the ejector member is not detected in the step S24, the step S24 returns to the step S23. On the other hand, when the request for the advance operation of the ejector member is detected in the step S24, the step S24 proceeds to a step S25. In the step S25, the advance operation of the ejector member is executed in the manual operation mode after the reverse operation of the ejector member is stopped.

When it is detected in the step S23 that the ejector member is stopped, the step S23 proceeds to the step S14 to bring the reverse operation to an end. Subsequently, in the step S15, the memory circuit 42-5 memorizes a current detected value detected by the updown counter.

On the other hand, when judgement is made in the step S16 that the reverse operation of the ejector member is not the initial one, the step S16 proceeds to a step S26. In the step S26, comparison is made between previous and current reverse limit positions of the ejector member as memorized in the step S15 upon the previous reverse operation and the current reverse operation of the ejector member to judge whether or not a difference exists therebetween. In absence of any difference, the step S26 proceeds to the steps S17 and S18 to carry out the similar operation as mentioned above. In presence of the difference, it is judged that the detected value detected by the position detector 41 and the absolute position of the ejector member are incoincident with each other due to the counting error by the updown counter, the error in the PG encoder itself, the counting error resulting from a noise, or the like. In a step S27, an indication of an abnormal condition is given.

When the mold is exchanged for another mold, it will be required to change the calibration completion position. In this event, a setup mode (preparation mode) is initiated to replace the detected value memorized in the step S15. Thereafter, when the reverse operation of the ejector member is carried out in the setup mode, an indication of the abnormal condition is once given. After resetting the indication of the abnormal condition, the reverse operation is again carried out. Thus, the calibration completion position can be changed.

Presence or absence of a difference in position of the ejector member can be monitored in the manner which will presently be described. As described above, the calibration completion position is determined after the control power supply is turned on. The count value of the updown counter corresponding to the calibration completion position thus determined is memorized as a reference value. On the other hand, a current calibration completion position is determined upon every reverse operation. Comparison is made between the reference value and the current calibration completion position. Upon incoincidence therebetween, presence of the difference is detected and an indication of the abnormal condition is given.

Figure 6:
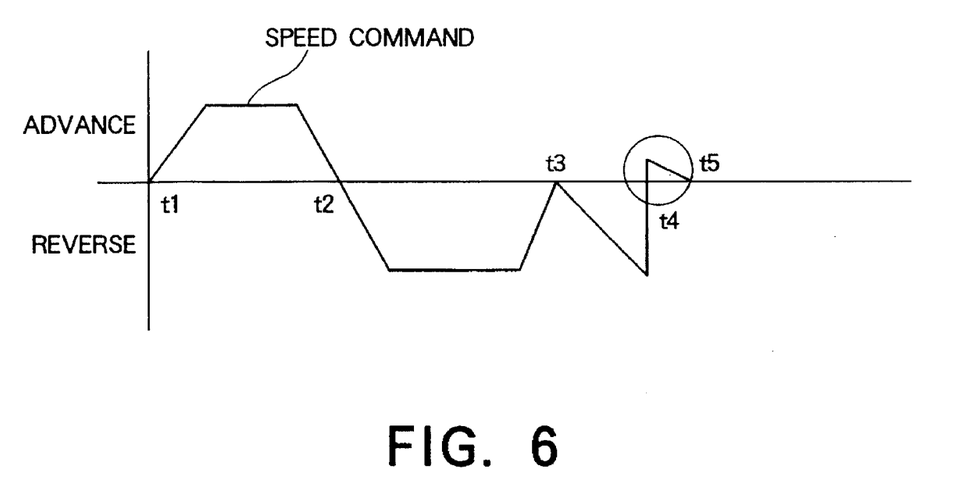
FIG. 6 is a view illustrating a time-varying movement of the ejector member according to this invention.

Referring to FIG. 6 in addition to FIGS. 3 and 5, description will be made as regards a displacement of the ejector member with the reverse operation and the advance operation. It is assumed here that the advancing distance required for ejection is equal to 50 mm. At the time instant t1, the advance operation is started in accordance with the selected speed value given by the first setting unit 42-1. After advancing by 50 mm, the ejector member is stopped at the time instant t2. Subsequently, the reverse operation is started to reach the calibration completion position at the time instant t3. The reverse operation is continued until the ejector member is stopped at the reverse limit position defined by the stopper 40 at the time instant t4. Then, the advance operation is carried out for a predetermined distance L until the ejector member is stopped at the calibration completion position at the time instant t5.

What is claimed is:

1. A control device for use in an injection molding machine comprising a mold for molding a resin material into a molded product and an ejector mechanism for ejecting said molded product out of said mold, said ejector mechanism comprising an ejector member and a servo motor for driving said ejector member said ejector mechanism being operable to carry out, when said molded product is ejected, an advance operation in which said ejector member is moved forward to a first position and to carry out, after said molded product is ejected, a reverse operation in which said ejector member is moved backward, said control device comprising:

a position detector for detecting a position of said ejector member by detecting a number of rotations of said servo motor to produce a position detection signal representative of a detected position; and a controller which is responsive to said position detection signal for controlling said servo motor and which is for carrying out a calibrating operation to determine a third position between said first position and a second position at a start of an injection molding process, said third position defining a reverse completion position of said ejector member;

said controller further comprising:

a speed control unit for controlling a rotation speed of said servo motor;

a setting unit for selecting said third position as a position spaced a predetermined distance L from said second position in an advance direction; and a processing unit responsive to said third position selected by said setting unit and to said position detection signal supplied from said position detector for producing a control signal to control movement of said ejector member, said control signal being supplied to said speed control unit;

said processing unit being for controlling said speed control unit at the start of said injection molding process to return said ejector member to a location of a stopper and then advancing said ejector member to said third position selected by said setting unit.

2. A control device of an ejector mechanism as claimed in claim 1, wherein said controller further comprises:

a memory unit for memorizing, in relation to a travelling distance of said ejector member, a position of said ejector member stopped by said stopper, said processing unit further carrying out judgement of whether or not said reverse operation of said ejector member is an initial one, comparison between previous and current travelling distances of said ejector member in a previous reverse operation and a current reverse operation when said reverse operation of said ejector member is not the initial one, judgement of whether or not a difference between said previous and said current travelling distance is smaller than a predetermined value, and decision of occurrence of an abnormal condition when said difference is not smaller than said predetermined value.

3. A control device of an ejector mechanism as claimed in claim 2, wherein said processing unit further carries out detection of a request for an advance operation of said ejector member during said reverse operation, and execution of the advance operation of said ejector member when presence of said request for an advance operation is detected.

* * * * *